C. L. KENNICOTT.
WATER PURIFYING APPARATUS.
APPLICATION FILED JAN. 27, 1915.
1,209,305.
Patented Dec. 19, 1916.
2 SHEETS—SHEET 2.
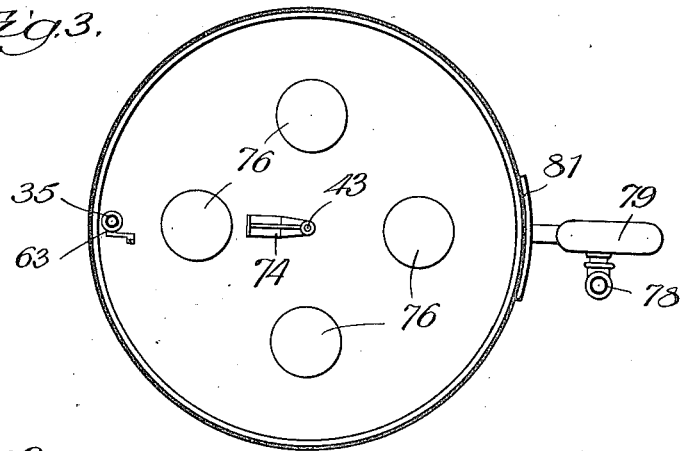
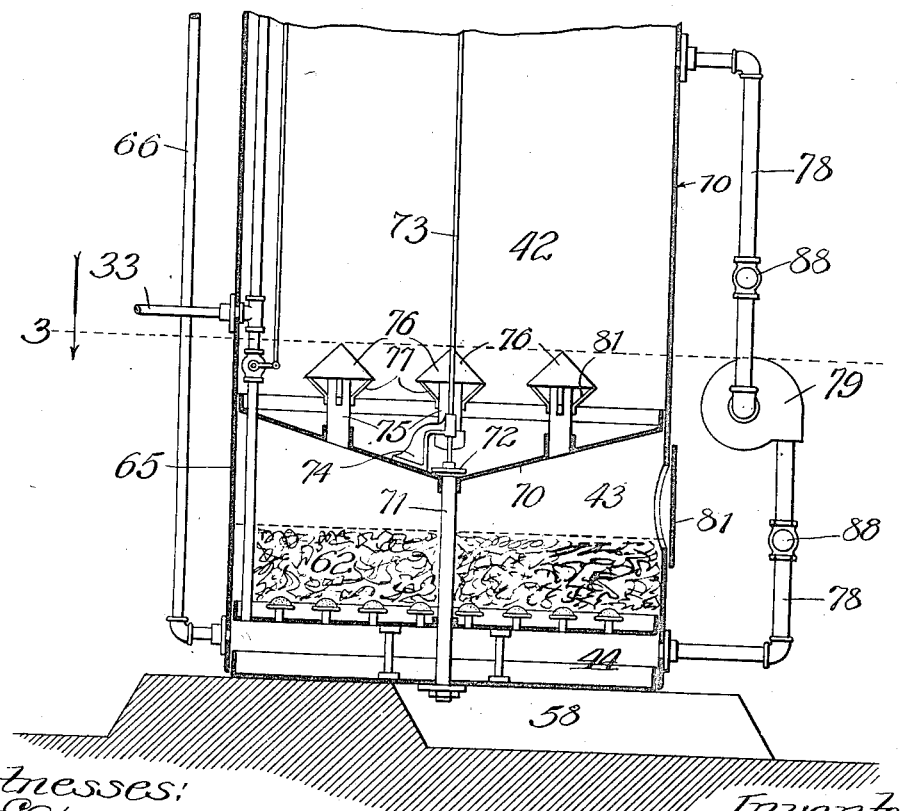

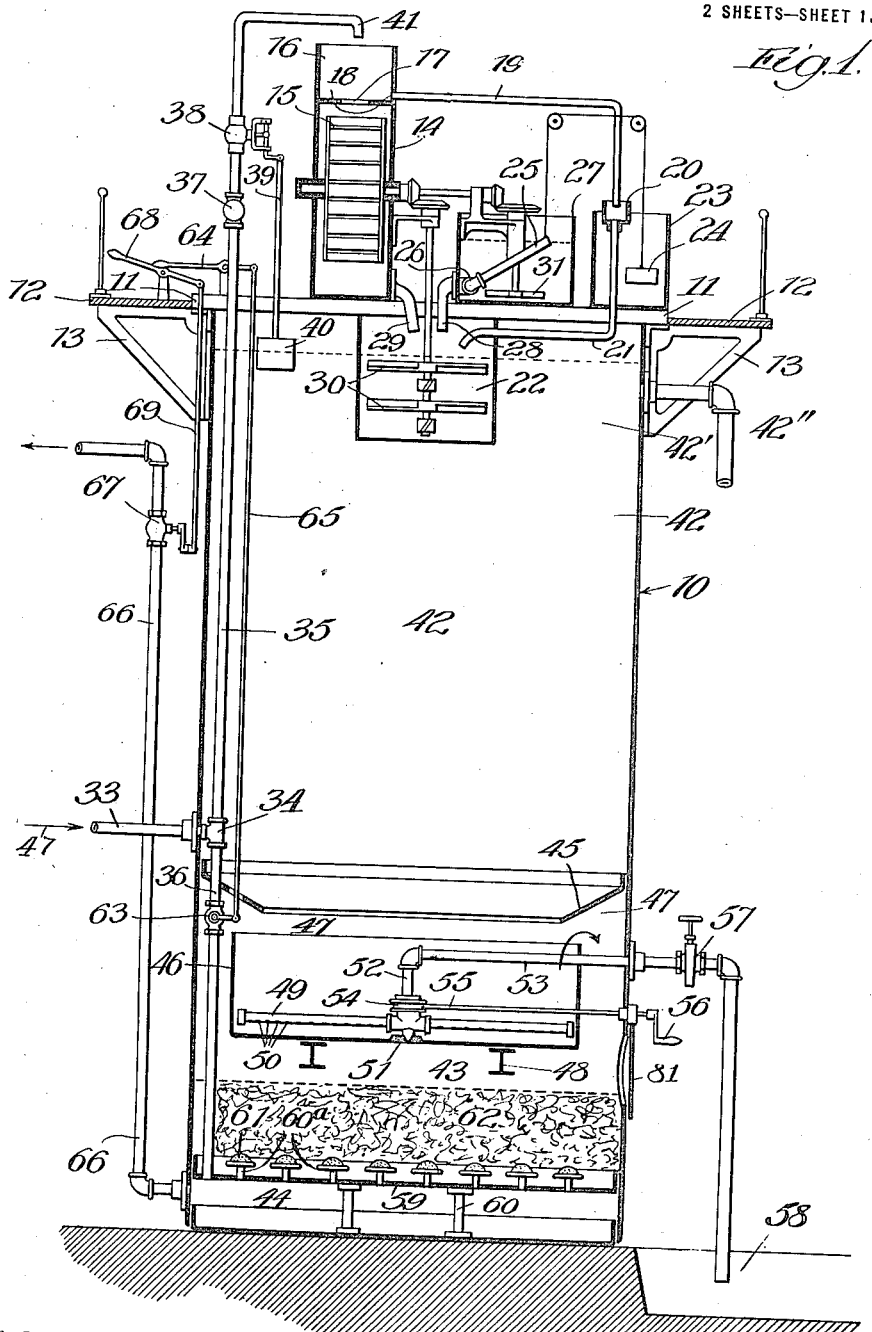

UNITED STATES PATENT OFFICE.

CASS L. KENNICOTT, OF CHICAGO HEIGHTS, ILLINOIS.

WATER-PURIFYING APPARATUS.

1,209,305.

Specification of Letters Patent.

Patented Dec. 19, 1916.

Application filed January 27, 1915. Serial No. 4,728.

*To all whom it may concern:*

Be it known that I, CASS L. KENNICOTT, a citizen of the United States, residing at Chicago Heights, in the county of Cook and State of Illinois, have invented a new and useful Improvement in Water-Purifying Apparatus, of which the following is a specification.

My invention relates to improvements in apparatus for purifying water, and more particularly to an arrangement of sedimentation tank and filter bed peculiarly applicable to the combination with water softening apparatus of the type commonly used in treating feed-water for boilers and kindred uses.

The object of the invention is to provide a sedimentation tank having a false bottom which will serve to trap and retain the greater proportion of solid impurities which settle out of the quiescent, or nearly quiescent, body of water.

A further object of the invention is to provide means for removing the deposited sediment, or sludge, from the false bottom of the sedimentation tank.

A further object of the invention is to provide, in combination with such a false bottom, a filter bed and strainer system so located as to be protected from the direct deposition of sediment thereon.

A further object of the invention is to provide means for flushing or cleaning the filter bed by reverse flow of water therethrough.

A further object of the invention is to provide means whereby the accumulated solid matter washed from the filter bed by the reverse flow may be trapped and retained by the false bottom of the sedimentation tank, the water used for washing purposes being permitted to flow directly into the sedimentation tank, from which it may again pass outward through the filter and be thereby conserved for useful purposes instead of being vented to the sewer, as is ordinarily the case with wash-water.

A still further object of the invention is to provide a suitable arrangement of pipes and valves for carrying on most simply and effectively the purposes of the apparatus.

A still further object of the invention is to provide for the combination of such sedimentation tank and filtering apparatus with standard types of chemical water-softening apparatus, so that the combined structure may be manufactured and operated as a single efficient unit.

Other objects and advantages of the invention will be more fully brought out from the following detailed description of two forms of construction in which the invention has been embodied. These two forms of construction are illustrated by the accompanying drawings, in which:

Figure 1 is a central vertical section through one form of water-purifying apparatus; Fig. 2, is a fragmentary view in vertical section of the lower end of the sedimentation tank of an apparatus similar to that shown in Fig. 1, but with a different arrangement of false bottom, or trap, the form of apparatus shown in Fig. 2 also including additional and more efficient and preferred means for washing the filter, and Fig. 3 is a section on the line 3 of Fig. 2.

Referring more particularly to the drawings; 10 designates as a whole a vertical cylindrical tank carrying on its top a platform 11, an overhanging runway 12 surrounding the platform being supported by two angle-brackets 13. Upon the platform 11 is mounted a chemical feeding and proportioning apparatus of well-known form, which is here illustrated schematically, consisting of a water-wheel casing 14 in which is mounted an overshot or bucket-wheel 15 which receives a stream of water from the dividing box 16 surmounting the wheel-casing 14, a relatively large aperture in the dividing box feeding the water to the wheel while a relatively small aperture 18 leads through a connecting pipe 19 and thence into a second dividing box 20 in which the water stream is again divided, a portion passing directly through an outlet 21 to a chemical mixing-chamber 22 and a portion passing into a regulating tank 23 in which is mounted a float 24 connected by suitable linkage with a chemical outflow-pipe 25 swiveled at 26 within a chemical tank 27 and feeding the liquid solution through an outlet spout 28 into the mixing chamber 22. The main supply of water emerges from the water-wheel casing 14 through a spout 29 directly into the mixing chamber 22, and the water-wheel shaft is used to drive, through suitable gear connections, stirring-blades 30 and 31 located, respectively, within the mixing tank 22 and the chemical tank 27. The raw or untreated water reaches the apparatus through an inlet pipe 33 which passes into the tank 10 and is there provided with a T-coupling 34 and upwardly and downwardly extending branches 35 and 36, respectively. The upwardly extending branch 35 passes out through the platform 11, and carries a hand-regulating valve 37 and an automatically-acting regulating valve 38, which is operable through a link 39 from a regulating float 40 which rides upon the surface of the liquid within the tank 10.

The upper extremity of the raw water supply pipe 35 discharges at 41 into the dividing box 16, the raw water being fed from this box to the mixing chamber 22 and thence into the main tank 10 in the manner described. The main tank 10 has three chambers therewithin, an upper chamber 42, which will be called the sedimentation chamber, a central chamber 43, which will be called the filtering chamber, and a lower chamber 44, which will be called the clear water well. Dividing the sedimentation chamber 42 from the filtering chamber 43 is a false bottom, comprising, in the form shown in Fig. 1, an annular, truncated, conical baffle 45, below which is mounted a sludge-cup 46, the baffle 45 extending inwardly beyond the walls of the sludge-cup and being spaced above the same to form an annular water passage, as designated by the arrow 47, in Fig. 1. The sludge-cup is preferably mounted on I-beams 48, which are suitably secured to the walls of the tank, and for removing deposited sludge from the bottom of the cup I provide a rotatable outlet member in the form of a horizontal pipe 49, having perforations 50 in its bottom wall and journaled at 51 to swivel about the down-turned end 52 of a drain-pipe 53. In order to revolve the sludge-remover 49 I provide the same with a worm-wheel 54, with which meshes a worm carried by the shaft 55 which extends through a wall of the cup and the wall of the tank and is provided on its projecting extremity with a hand-crank 56. The drain-pipe 53 is also extended outwardly through the wall of the tank 10, and carries a hand-controlled valve, or cock, 57, the drain-pipe being extended beyond this valve to lead into the sewer, as indicated at 58.

The filter chamber 43 is separated from the clear-water well 44 by a partition 59, supported as by columns 60, and perforated at a plurality of points to receive nipples 60ª which carry strainer-heads 61, these strainer-heads lying within a body of filtering material, such as quartz, sand, excelsior or porous brick, illustrated conventionally in the drawing and designated 62. The downwardly-extending branch 36 of the raw-water supply pipe 33 passes through the baffle member 45 of the false bottom, thence through the filter-chamber and into the clear-water well 44, a valve 63 being interposed in this pipe and controlled from the runway 12 of the platform by a lever 64 and connecting-link 65. The clear water is drawn from the well 44 through an upwardly-extending outlet pipe 66 which is provided with a regulating-valve 67 operable from the runway of the platform by a lever 68 and a connecting-link 69.

The operation of this form of my improved water-purifying apparatus is as follows: The water to be treated enters normally from the raw-water supply pipe 33 and passes thence upwardly through the branch 35 and outlet 41 into the dividing-box 16, from which the main stream of raw water passes downwardly, revolving the water-wheel 15 and discharging into the mixing-chamber 22. A certain predetermined proportion of the water discharging into the dividing-box passes through the outlet 18 and pipe 19 into a second dividing-box 20 and from the latter into the regulating-tank 23, whereby this tank becomes slowly filled and the float 24 therein rises and permits of the submersion of the swiveled outlet-pipe 25 in the chemical tank 27, whereby a certain regulated proportion of the chemical solution feeds from this latter tank out of the spout 28 and becomes mixed with the raw water in the mixing chamber 22, the stirrers 30 and 31 being rotated during this time by their connection with the water-wheel shaft.

In the operation as above described, the hand-regulated valve 37 will be open and the valve 63 closed and it will be assumed that the level of the liquid within the tank 10 is such that the float 40 is in a lowered position, thereby holding the valve 38 open. During this operation, the drain-valve 57 will be closed. As the raw water and chemicals are mixed within the chamber 22, a reaction will take place by which certain of the impurities in the water will be precipitated, this re-action taking place slowly both within the mixing-chamber 22 and within the sedimentation-chamber 42 in communication therewith. As the precipitate is formed it will slowly sink through the sedimentation-chamber 42 and will be caught upon the baffle 45 and within the sludge-cup 46. Simultaneously with this downward movement of the precipitate, the water itself will move slowly downward through the sedimentation-chamber 42 and following the path of the arrows 47 will flow back up under the baffle 45 and thence into the filtering chamber 43. The water having been freed of the greater proportion of solid impurities before it reaches this chamber, will pass from the filter-chamber through the filter-bed 62 in which any remaining impurities will be entangled, out through the strainers 61 and into the clear water well 44 from which it will be drawn by the outlet pipe 66 in regulable quantities, as determined by the adjustment of the outlet valve 67. It will further be noted that the tank 10 and outlet-pipe 66 form an inverted siphon, and the effective head of liquid upon the filtering medium 62, and consequently the capacity of the apparatus, may readily be increased by lowering the level of the top of the outlet-pipe 66, whereby a greater effective head is maintained upon the filter and the rate of filtration is increased.

It should be particularly noted in connection with the description of the operation, as above set forth, that the direction of movement of the water through the sedimentation-chamber 42 is the same as the direction of movement of the precipitate within this chamber. This action is particularly valuable, since it has been found in practice that the precipitate formed by the re-action of the chemicals commonly used for the treatment of boiler feed-water is so extremely fine that an upward flow of water equivalent to a very few feet per hour is sufficient to largely prevent the sediment from dropping to the bottom of the tank, or chamber. By my construction, the water and the precipitate are both moving in the same direction until the false bottom of the chamber 42 has been reached. A large proportion of the precipitate has then been deposited upon the baffle 45 and the greater proportion of the residue sinks into the quiescent body of water within the sludge-cup 46, it being possible to maintain a relatively high upward flow of water through the annular opening 47 without interfering with this precipitation of the sediment. By the action of the two elements 45 and 46, which constitute the false bottom, I am therefore able to free the water in large measure from the solid impurities and the filter 62 is therefore largely relieved from its ordinary functions and may be made much smaller and much less efficient and costly than is necessary in other forms of apparatus having the same capacity.

When the apparatus as described above has continued in operation for some length of time, and it becomes desirable to remove the accumulated sediment, or sludge, from the cup 46, this is accomplished by opening the drain-cock 57 and simultaneously turning the hand-crank 56, whereby the horizontal outlet-pipe 49 is revolved above the bottom of the cup and the accumulated sludge siphons upward through the pipe 53 and into the sewer 58. During this sludge-removing operation it is desirable that the hand-valve 37 controlling the raw water supply be closed and that the delivery valve 67 be also closed, whereby the apparatus is temporarily put out of operation. When the outlet water flowing into the sewer 58 from the sludge-cup begins to become reasonably clear of sediment, the cock 57 will be closed. To complete the operation of preparing the apparatus for another run it is desirable to wash the filter-bed 62. This is accomplished by opening the valve 63, thereby permitting the raw water, which will normally be under some considerable pressure, to flow downwardly through the pipe 36 into the clear water well 44, and thence upward in a reverse direction through the filter-bed 62. It is desirable that in this washing action the full water pressure available upon the raw water supply be applied, so that the upward or reverse flow of water through the filter may be as rapid as possible, in order to thoroughly cleanse and wash the interstices of the same free of any accumulated sediment. The wash water passing upwardly through the filter with considerable velocity will carry up with it any sediment lying within or upon the top of the filter-bed. This sediment will, by the continued flow of the water, be kept stirred up, and the greater proportion of the same will be carried back up through the false bottom constituted by the baffle 45 and cup 46 and thence into the sedimentation chamber 42. It will be noted that the raw water used in washing the filter-bed is not wasted, but on the contrary is entirely conserved and serves to replace the water drawn off to the sewer in removing the sludge from the cup 46. When it is considered that there has been a sufficient reverse flow of water through the filter to effectively cleanse the same, the valve 63 is closed and the valves 37 and 67 are opened. The apparatus is then in condition for another "run." If it is considered that the quantity of raw water supplied to the sedimentation chamber 42 through the pipe 36 is great enough to overcome the slight excess of chemicals always used in treating the water, so that, considered as a whole, the quantity of water in the sedimentation chamber 42 is insufficiently treated to any material extent, a small additional amount of chemicals may be added by hand from the platform 11, either by dropping such chemicals directly into the sedimentation chamber or by operating by hand the float 24.

It should be particularly noted in connection with the operation of washing the filter that although the filter wash-water passes directly into the sedimentation chamber, carrying with it the washed out precipitate, that this precipitate is just as effectively and permanently removed from the filter as though the whole of the filter wash-water had been wasted to the sewer, as in common practice, for practicaly the entire mass of this washed-out precipitate will be trapped by the baffle and sludge-cup, and only a very small percentage, which may remain in the filter-chamber 43 and which may be carried over through the annular outlet 47, will again reach the filter-bed. Thus, the precipitate washed from the filter at the end of one "run" is during the next succeeding "run" largely trapped by the sludge-cup and at the end of this "run" is drained off to the sewer. I consider this action of my apparatus as of the greatest importance, as it permits me to conserve the considerable quantity of water required for thoroughly washing the filter-bed, and since the filter wash water is no longer wasted, there is no longer any tendency to permit the filter to foul up unduly before cleansing. By my construction it becomes possible and desirable to thoroughly wash the filter at the end of each few hours of running, that is, each time the drain-cock is opened to flush out the sludge. By thus rendering it possible to keep the filter-bed at all times thoroughly cleansed without waste of water I promote the efficiency of the whole apparatus and its satisfactory operation.

In Figs. 2 and 3 I have shown an apparatus similar in construction and operation to Fig. 1, but having a slightly different form of false bottom interposed between the sedimentation-chamber 42 and the filter-chamber 43, and also being provided with means by which the water for washing the filter-bed may, if desired, be taken from the sedimentation-chamber instead of from the raw water supply, or from either or both of these sources, the advantage being that there is no admixture of raw or untreated water within the clear well, filtering chamber, and sedimentation chamber, if the water for washing the chamber be drawn wholly from the sedimentation chamber.

In the construction of apparatus shown in Figs. 2 and 3 the reference characters used are the same as those used in connection with Fig. 1 in all cases where the structure of the parts is identical. It will, therefore, be unnecessary to describe the apparatus of Figs. 2 and 3 except to point out wherein it differs in construction from the apparatus of Fig. 1. In Figs. 2 and 3 the false bottom of the sedimentation chamber 42 consists of a conical partition 70, from the center of which leads a drain-pipe 71 which passes downwardly through the filter-bed 62 and through the bottom of the filter-bed and bottom of the tank 10 and thence into the sewer 58. The drain-pipe 71 is controlled by a disk-valve 72 operable from the platform 11 by some suitable means (not shown) and through a connecting valve-rod 73 which is guided by a bracket 74 fastened upon the partition 70. The partition 70 is perforated at a plurality of points, and in each perforation is mounted a short vertical pipe-section 75 open at both ends and carrying at its upper end a hood 76 supported by arms 77. Tapped into the wall of the sedimentation chamber 42 is a by-pass pipe 78, the lower end of which communicates with the clear water well 44, and interposed in this by-pass pipe is a centrifugal pump 79. Suitable hand-controlled valves 88 may be placed at either side of the pump. The pump 79 will be driven from some suitable power source, not shown.

The operation of the form of apparatus shown in Figs. 2 and 3 is in general identical with that of the apparatus shown in Fig. 1. That is, the raw water is similarly supplied through the pipe 33, passes upwardly to a chemical feeding and proportioning apparatus and is in the top portion of the sedimentation-chamber 42 mixed with the chemical precipitating agents. In Figs. 2 and 3 also there is the same downward flow of the water through the sedimentation-chamber 42 and simultaneously, a similar downward movement of the precipitate and solid matter suspended in the water. The false bottom 70 acts to trap the precipitate, the water thus freed of the precipitate being permitted to flow under the hoods 76, and thence downwardly to the filtering chamber 43 through the filtering bed 62 and into the clear water well 44. This form of false bottom acts in substantially the same manner in all ways as the false bottom composed of the members 45 and 46 in Fig. 1, there being in each case a horizontal surface covering the vertically projected area of the sedimentation chamber, the outlet for water being laterally and vertically upward. Owing to the conical form of the bottom 70, it is possible to dispense with the revolving sludge-remover, it being found that the central opening in the downwardly sloping bottom will effectively drain off all the sludge which rests upon the bottom. The form of the outlets from the false bottom shown in Figs. 2 and 3 is regarded as slightly superior to the false bottom of Fig. 1, in that the nipple 75 lies within the hood 76 and thereby produces a more decided or abrupt change in direction of the flow of water, which assists in freeing the water of the precipitated matter and throwing the same downwardly onto the bottom.

The principal advantage of the construction shown in Figs. 2 and 3, however, lies in the arrangement of the by-pass 78 and pump 79. Thus when the sludge has been drained off through the pipe 71, the pump 79, which is preferably of considerable capacity, is operated to produce a flow of water downwardly through the by-pass and into the clear water well, and thence upwardly to cleanse the filter-bed and this cleansing, it will be seen, is effected by treated water and not by raw water. The reverse flow of water through the filter-bed can, therefore, be longer continued, resulting in more effective cleansing of the filter without the objectionable addition of any raw water, and therefore without the necessity of adding any chemicals to counteract the harmful effect of this raw water. It may be pointed out, however, that in order to be effective in cleansing the filter there should be a comparatively rapid flow of water through the by-pass, which will require the use of a relatively large and costly pump, which additional expense is obviated in the construction shown in Fig. 1.

In both the construction shown in Fig. 1 and that shown in Figs. 2 and 3 it is desirable to provide the tank 10 with the manhole 81 opening into the filter-chamber 43 and by which access may be had to the filter-bed for repairing and renewing the same. By my arrangement of the filter bed in the bottom portion of the water-purifying apparatus, it is much more convenient, and less costly, to repair or renew the filter than as if the same occupied its usual position at the top of the apparatus.

A further advantage of my construction of apparatus lies in the fact that in that portion 42' of the sedimentation chamber 42 which lies above the lower end of the mixing chamber 22, I have, in effect, an emergency reservoir of clear softened or treated water, which may be withdrawn for emergency uses, as by an emergency outlet 42'', shown in Fig. 1. This function of the chamber 42' results from the fact that the flow of water is downwardly through the sedimentation chamber from the mixing chamber 22, and this surface strata of water from the chamber 42' will therefore be entirely free of sediment at all times.

Recapitulating, it may be stated that the principal advantages of my construction are: 1. Greatly increased capacity of the water-purifying apparatus of the type shown, due to the fact that the flow of water through the apparatus is in the same direction as the downward movement of the precipitated material, resulting in better separation of the water and precipitate. 2. Protection of the filtering bed from the direct deposition of sediment thereon, whereby a smaller, less costly and less efficient filter-bed is required. 3. Decrease of operating expense of the apparatus, due to the fact that the filter washwater is wholly conserved, no water being wasted at any time during the operation of the apparatus except that required for washing out the sludge. 4. Capability of increasing the capacity of the apparatus by merely lowering the end of the outlet pipe, whereby the effective head upon the filter is increased. 5. Convenience and economy in construction and operation due to the fact that the filter-bed is so arranged as to be readily accessible from the ground level in assembling, for renewal, and repairs. 6. The possibility of using treated water instead of raw water for washing the filter-bed, whereby the accuracy of the chemical treatment is not disturbed by the washing operation. 7. More efficient and satisfactory operation of the apparatus as a whole, due to the fact that the filter-bed may always be kept in good condition by frequent washing and with the minimum of expense and trouble.

While I have shown and described in considerable detail two specific forms of apparatus designed in accordance with the principles of my invention, it is to be understood that such showing and description is illustrative only, and that I do not regard my invention as limited to the particular construction and arrangement of the parts as shown and described, except in so far as I have included such limitation within the terms of the following claims, in which it is my intention to claim all the novelty inherent in my invention as broadly as the prior art will permit.

What I claim is:

1. In apparatus of the class described and in combination, a tank, means for supplying raw water and chemicals to the top of said tank for reaction therein, a sedimentation chamber located below the top of said tank, a filtering chamber below said sedimentation chamber, a partition between said filtering chamber and said sedimentation chamber and covering substantially the whole of the vertically projected area of the latter, whereby precipitated solid matter will be caught upon the said partition, means forming communication between said sedimentation chamber and filtering chamber through said partition, a filtering medium in said filtering chamber, means for drawing off filtered water through said filtering medium, and means for reversing the flow of water through said filtering medium for cleansing the same, said reverse flow of water passing through said partition and into said sedimentation chamber.

2. In apparatus of the class described, and in combination, a tank, means for supplying raw water or chemicals to the top of said tank for reaction therein, a sedimentation chamber located below the top of said tank, a filtering chamber below said sedimentation chamber, a partition between said filtering chamber and sedimentation chamber and covering substantially the whole of the vertically projected area of the latter, whereby precipitated solid matter may be caught upon the said partition, means for removing the precipitate from the partition, means forming communication between said sedimentation chamber and filtering chamber through said partition, a filtering medium located in said filtering chamber, means for drawing off filtered water through said filtering medium, and means for reversing the flow of water said reverse flow of water passing through said partition and into said sedimentation chamber, for the purpose described.

3. In an apparatus of the class described, and in combination, a tank, means for supplying raw water and chemicals to the top of said tank for reaction therein, a sedimentation chamber located below the top of said tank, a filter chamber below said sedimentation chamber, a partition between said filter chamber and said sedimentation chamber and covering substantially the whole of the vertically projecting area of the latter, means forming communication between said filter chamber and said sedimentation chamber through said partition, a filtering medium located in said filter chamber, a clear water well located beyond said filtering medium, means for drawing off filtered water from said clear water well, and a by-pass connecting said sedimentation chamber and said clear water well, and a pump for forcing water into said clear water well from said sedimentation chamber, whereby a reverse flow of water through said filtering medium, filtering chamber and partition and into said sedimentation chamber is obtained, for the purpose described.

4. In an apparatus of the class described, a tank, means for supplying raw water and chemicals to the top of said tank for reaction therein, a sedimentation chamber located below the top of said tank, a filter chamber located below said sedimentation chamber, a partition between said sedimentation chamber and filter chamber and covering substantially the whole of the vertically projected area of the former, means forming communication between said sedimentation chamber and said filter chamber through said partition, a filtering medium located in said filter chamber, a clear water well beyond said filtering medium, means for drawing off filtered water from said clear water well, means for supplying raw water under pressure to said clear water well, a by-pass communicating at one end with said sedimentation chamber and at the other end with said clear water well, and a pump interposed in said by-pass and adapted to force water from the sedimentation chamber into the clear water well, for the purpose described.

5. In an apparatus of the class described, and in combination, a tank, means for supplying raw water and chemicals to the top of the tank for reaction therein, a sedimentation chamber located below the top of the tank, a downwardly-sloping conical botton for said sedimentation chamber, a central outlet at the apex of the conical bottom, a drain-pipe communicating with said outlet, a valve controlling the drain-pipe, vertical pipe-sections passing through said conical bottom and open at both ends, hoods mounted over the open upper ends of said pipe-sections, a filter chamber below said bottom, a filtering medium within said filter chamber, a clear water well below said filtering medium, means for drawing off filtered water from said clear well, and means for forcing water into said clear water well under pressure for reverse flow through said filter and into said sedimentation chamber, for the purpose described.

CASS L. KENNICOTT.

In presence of—
R. S. ELLIS,
H. C. ALGER.